Oct. 6, 1964    H. P. WICKHAM    3,152,066
HYDROCARBON CONVERSION PROCESS
Filed April 6, 1961
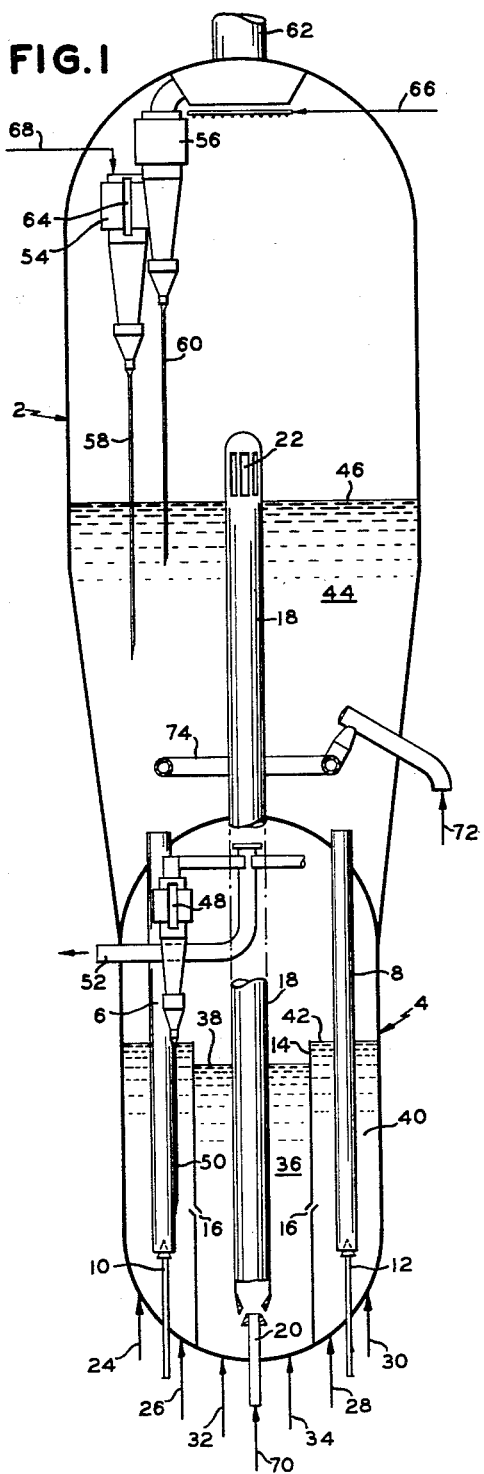
FIG. I
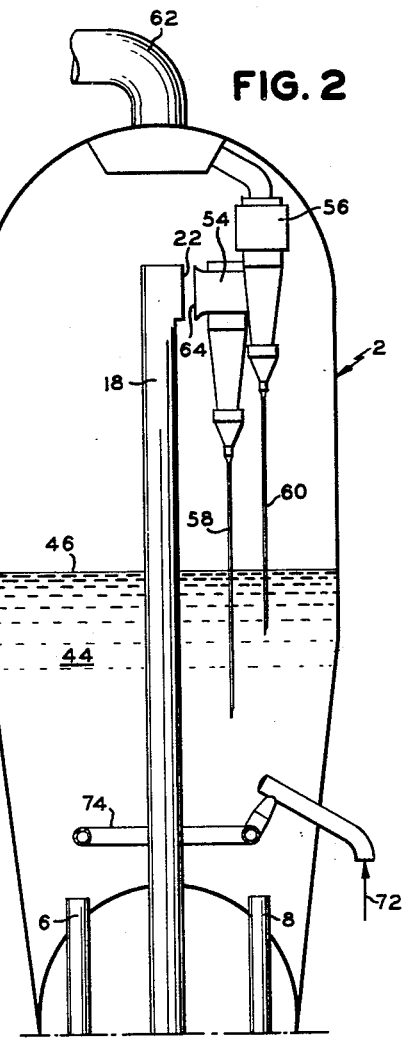
FIG. 2
*INVENTOR.*
HENRY P. WICKHAM
BY *G. H. Palmer*
ATTORNEY
*Carl D. Farnsworth*
AGENT United States Patent Office 3,152,066
Patented Oct. 6, 1964

3,152,066
HYDROCARBON CONVERSION PROCESS
Henry P. Wickham, Glen Head, N.Y., assignor, by mesne assignments, to Pullman Incorporated, a corporation of Delaware
Filed Apr. 6, 1961, Ser. No. 101,104
11 Claims. (Cl. 208—163)

This invention relates to the conversion of hydrocarbons under relatively high temperature conditions in the presence of finely divided catalytic material and the regeneration of the catalytic material. More specifically the invention relates to the method and means for handling catalytic material employed in the conversion of hydrocarbon material.

It is known that systems employing fluidized catalyst have pronounced advantages over, for example, compact moving bed systems, particularly with respect to flexibility of operation and the fact that turbulent fluid bed systems substantially reduce temperature gradients in the fluid bed. However, a fluid bed system is subjected to the disadvantage of non-uniformity of residence time for the individual catalyst particles within the fluid bed. That is, in fluid bed systems some of the catalyst particles have a tendency to pass through the fluid bed in a relatively short time and before the individual particle has been sufficiently acted upon by a suitable gasiform material such as employed in a regeneration zone.

It is an object of this invention to provide an improved method of handling catalyst in a fluid bed system.

Another object of this invention is to provide an improved method of regenerating catalyst particles employed in a fluid bed system.

A further object of this invention is to improve the efficiency of a hydrocarbon conversion-catalyst regeneration system.

Other objects and advantages of this invention will become more apparent from the following description.

The invention is more clearly understood by reference to the drawings which are diagrammatic illustrations in elevation of embodiments for practicing the method of this invention. It is to be understood, however, that it is not essential in the method of this invention to position the regenerator above the reactor as specifically shown and described herein since the method of this invention is applicable in other arrangements of apparatus employing fluidized catalyst beds. For example, the regenerator may be positioned by the side of the reactor or beneath the reactor.

Referring now to FIGURE 1, a unitary apparatus is shown wherein the regeneration chamber 2 is positioned above the reactor chamber 4. One or more open end standpipes or conduits 6 and 8 extend downwardly from the bottom or lower portion of the regenerator chamber to the lower portion of the reactor chamber in line with vertically movable plug valves 10 and 12 respectively. A cylindrical stripping chamber open at its upper end and formed by cylindrical baffle member 14 is positioned within the reactor chamber and extends upwardly from the semi-spherical bottom thereof to an upper portion of the reactor chamber and substantially above the intermediate portion thereof. A plurality of slot means 16 or open passageways are provided in baffle 14 to provide open passageway means between the annular reaction chamber surrounding the cylindrical stripping chamber for passage of finely divided contact material maintained in a dense fluidized bed condition in each of said chambers from the annular reaction chamber to the cylindrical stripping chamber. A riser conduit 18 extends from within the lower or bottom portion of the cylindrical stripping chamber substantially vertically upward to an upper portion of the regenerator chamber and at least above the intermediate portion of the regenerator chamber. Riser conduit 18 open at its bottom end is aligned with a vertically movable hollow stem plug valve 20. The top of riser 18 or discharge end thereof is arranged to alter the vertical velocity component of a suspension passed upwardly therethrough. For example, riser 18 may be capped and provided with a plurality of vertical slots 22 positioned around the upper periphery of the riser or the riser discharge may be arranged as an L-shaped discharge which discharges the suspension as a single stream rather than a plurality of radial streams. Although the riser discharge may vary considerably in size, depending upon the diameter of riser 18, it is a general practice to provide a total discharge area which is at least about 1 to about 1½ times the cross-sectional area of the riser. Furthermore, the cross-sectional area of the riser at its discharge end may be enlarged to effect a substantial reduction in velocity of the suspension passing upwardly therethrough prior to being discharged from the riser. A plurality of feed nozzles 24, 26, 28 and 30 are provided for introducing hydrocarbon feed material into the bottom or lower portion of a bed of catalyst in the annular chamber with a plurality of nozzles such as 32 and 34 provided for introducing gaseous stripping material such as steam to the lower portion of a bed of catalyst in the cylindrical stripping chamber.

In the arrangement of apparatus herein described, a relatively dense fluid bed of catalytic material 36 having an upper level 38 is maintained in the cylindrical stripping chamber and is surrounded by a separate annular dense fluid bed of catalytic material 40 having an upper level 42. A dense fluid bed of catalytic material 44 having an upper level 46 is maintained in the lower portion of the regeneration chamber having an upper level or meniscus which is below the discharge of riser 18. A plurality of cyclone separators represented by 48 with dipleg 50 are provided in the upper portion of the reactor chamber which are connected to a common product withdrawal conduit 52. There may be two or more stages of cyclone separators connected in series and a plurality of stages of cyclone separators are employed and connected to withdrawal conduit 52. A plurality of cyclone separators as shown by 54 and 56 provided with diplegs 58 and 60 respectively connected to withdrawal conduit 62 are also provided in the upper portion of the regenerator chamber. The gaseous products of combustion entraining catalytic material enter the first stage of cyclone separators connected in series by inlet 64 and are discharged after removal of catalytic material from the regenerator by conduit 62 with the separated catalytic material being returned to the dense fluid bed of catalytic material by suitable diplegs 58 and 60. Conduit 66 is provided in the upper portion of the regenerator for introducing purge steam thereto and conduit 68 is provided for adding quench steam or water to the combustion gases between the series connected cyclone separators. Conduit 70 is provided for introducing relatively inert gaseous material to hollow stem plug valve 20 aligned with the bottom open end of riser 18. Conduit 72 connected to distributor ring 74 provides means for introducing regeneration gas such as air or oxygen containing gaseous material to the lower portion of the dense fluid bed of catalytic material in the regeneration chamber.

In the method of this invention, the catalytic material continuously circulates from the regenerator to the annular reaction zone, the stripping zone and back to the regeneration zone in the plurality of conduits and open passageways hereinbefore described. In the system described herein regenerated catalytic material at a temperature in the range of from about 950° F. to about 1250° F., preferably about 1150° F., is passed from the lower portion of the regeneration zone to the lower portion of the annular bed of catalyst in the conversion zone by standpipes 6 and 8. Hydrocarbon feed material is introduced by a plurality of feed nozzles represented by nozzles 24, 26, 28 and 30 into the annular dense fluid bed of catalyst maintained at a temperature in the range of from about 900° F. to about 1000° F. for conversion into desired products. During conversion of the hydrocarbon feed material the catalyst becomes coated with hydrocarbonaceous material which is removed in a sequence of steps involving stripping and regeneration of the catalyst at an elevated temperature. Accordingly, finely divided catalytic material coated with hydrocarbonaceous material and entraining hydrocarbon product material is continuously withdrawn from the annular fluid bed and passed by slots or passageways 16 into the dense fluid bed of catalytic material in the cylindrical stripping zone. In the stripping zone hydrocarbon material is recovered from the catalyst with a relatively inert stripping gas such as steam or other suitable gaseous stripping material. Hydrocarbon conversion products including stripped products and stripping gas are removed from the upper portion of the dense fluid catalyst beds in the reaction and stripping zones and passed through the cyclone separators as a combined stream for removal of entrained catalyst. The separated and recovered catalyst is returned to the dense catalyst bed in the annular reactor chamber with the hydrocarbon product material and gaseous stripping material being removed therefrom by conduit 52 for separation into desired products in suitable recovery equipment, not shown. Generally, stripping of the catalyst is effected at temperatures substantially equal to or slightly below the temperatures employed during conversion of the hydrocarbon feed to maximize the thermodynamic efficiency of the system. However, the stripping temperature may be maintained above or below hydrocarbon conversion temperatures employed as desired. The stripping temperature will be dependent somewhat upon the type of feed material being converted, catalyst, the heat balance of the system, and the conditions required to remove difficultly vaporizable hydrocarbon material clinging to the catalyst particles.

In the method of this invention the stripped catalytic material contaminated with residue carbonaceous material unremoved during the stripping step is withdrawn from the lower portion of the stripping zone, mixed with a relatively inert gaseous material, preferably steam introduced by hollow stem plug valve 20 and the mixture conveyed by riser 18 as a relatively dilute suspension upwardly for discharge into the dilute catalyst phase and preferably substantially above the upper dense phase level of the bed of catalyst in the regeneration zone.

Any suitable relatively inert carrier or lift gas may be employed in riser 18, such as cooled flue gas, steam or mixtures of steam with flue gas or air. It is preferred, however, to employ a gaseous stream substantially steam alone so that the amount of oxygen in the carrier or lift gas will not effect any appreciable rise in temperature of the suspension and permit introducing the suspension into the dilute phase of the regeneration zone at a temperature substantially below regeneration temperatures. In accordance with this invention the temperature of the suspension in riser 18 is to be substantially below the temperature employed in the regeneration zone and sufficiently cool upon discharge into the regenerator dilute phase to have a cooling effect upon the hot gaseous combustion product of regeneration therein. The suspension being preferably from about 50° F. to about 250° F. below regenerator temperature is discharged from the riser into the upper portion or dilute phase of the regenerator and above the dense fluid catalyst bed level at a temperature and quantity sufficient to exert a cooling effect upon the regenerator combustion gases and the dilute catalyst phase existing above the dense phase of catalyst. That is, in accordance with one embodiment of this invention, as shown in FIGURE 1, the catalyst suspension discharged into the lower portion of the dilute catalyst phase of the regeneration zone is at a temperature sufficient to effect cooling of the gaseous products of regeneration as the suspended catalyst settles out into the fluid bed of catalyst countercurrent to rising gaseous combustion products or when picked up as entrained catalyst and carried into the cyclone separators. During this step the gaseous combustion products effect a high temperature stripping of the catalyst thereby reducing the quantity of carbonaceous material to be removed by burning in the presence of oxygen-containing gas in the dense fluid catalyst bed. The gaseous combustion products at a reduced temperature and entrained catalyst then enter the first of the series of connected cyclone separators for passage therethrough and recovery of entrained catalyst particles from the gaseous material. The thus separated and recovered catalyst is passed to the dense fluid bed of catalyst in the regenerator by suitable diplegs provided. In the method of operation described with respect to FIGURE 1, a major portion of the catalyst in the suspension discharge from the riser into the regenerator dilute phase separates from the lift or carrier gas due to a change in the vertical velocity component of the suspension which permits it to settle out and thereafter enter into the dense fluid bed of catalyst undergoing regeneration with the remaining portion of the suspended catalyst and all of the lift gas in addition to regenerator combustion gases passing into and through the series of connected cyclones for recovery of entrained catalyst from the gaseous material. The catalyst contaminated with carbonaceous material settling out of the dilute phase and that separated by the cyclone separators and returned to the dense fluid bed is treated with oxygen-containing gas such as air in the dense fluid bed of catalyst under regeneration temperature conditions to remove the carbonaceous material therefrom by burning, thereby heating the catalyst to a desired elevated temperature. The oxygen-containing gas such as air or air enriched with oxygen employed for combustion of the carbonaceous material is introduced to the lower portion of the dense fluid bed of catalyst by a suitable conduit 72 connected to distributor ring 74. Generally the dense fluid bed of catalyst being regenerated is maintained at a temperature in the range of from about 1000° F. to about 1400° F., and preferably from about 1100° F. to about 1200° F.

In another embodiment of the invention described herein, FIGURE 2 shows diagrammatically a modification of the regenerator arrangement of FIGURE 1 wherein the riser 18 is extended sufficiently into the upper portion of the regeneration zone such that the riser discharge is substantially adjacent to the inlet to the first of the series of connected cyclone separation zones. That is, riser 18 is extended into the upper portion of the dilute phase such that the riser discharge or opening 22 is opposite to inlet 64 of cyclone 54. By directing the riser outlet towards the inlet of the first cyclone in the series of cyclone separators a greater or major portion or volume of the relatively cool catalyst in suspension and discharged from the riser will pass into the cyclones for cooling of the hot gaseous regeneration combustion products. Thereafter the catalyst is separated from the gaseous material in the cyclones below secondary combustion temperatures with the thus separated catalyst being returned or passed to the bed of catalyst being regenerated therebelow. In either of the embodiments specifically described herein the stripped catalyst recovered from a hydrocarbon conversion zone is passed into the dilute phase of the regeneration zone at a temperature sufficiently below regeneration temperatures to exert a substantial cooling effect upon the gaseous combustion products of regeneration by direct contact with a relatively large quantity of the cooled catalyst in suspension.

It has been found when operating in accordance with the methods described herein that substantially improved and unexpected results were obtained over that obtained when the riser discharged in the lower portion of the dense fluid bed of catalyst in the regeneration zone. That is, by circumventing the head of catalyst above the spent catalyst riser discharge in accordance with this invention, it is possible to increase the pressure level on the entire apparatus by a value equal to the normal dense bed pressure head at substantially no increase in regeneration air blower discharge pressure. This also permits operating the regeneration zone at normal velocity conditions, higher combustion air rates and more importantly higher oxygen partial pressure. Furthermore, higher regenerator bed temperatures may be successfully employed when operating in accordance with the methods of this invention with less quench steam in the cyclone separators from that previously employed. A further advantage resides in the method of this invention in that a considerable increase in the plug valve pressure differential is provided by a value substantially equal to the pressure head of the regenerator dense fluid bed of catalyst. When operating the unit in accordance with the invention herein described, smoother operation of the unit was possible due to a gain in total plug valve pressure differential equivalent to about 2.5 p.s.i. It was also found in addition to the above advantages that regeneration of the catalyst was substantially improved to the extent that carbon on regenerated catalyst was reduced about 30 percent over that previously obtained while operating with about 70 percent of the regenerator catalyst inventory. This would suggest that more uniform residence time of the individual catalyst particles was obtained in the fluid catalyst system of this invention. In addition to the above, it was found depending upon the particular arrangement employed that a marked reduction of up to about 50 percent less quench steam was required in the cyclone separator system to prevent after-burning occurring therein. This substantial reduction is of particular importance to the operator in that it minimizes the quantity of gaseous material which must be made available and passed to the operating unit.

The improvements discussed hereinbefore more efficiently utilizes regeneration air since the oxygen content of the flue gas is substantially lower after extension of the riser to discharge above the bed rather than into the bed of catalyst even though a greater quantity of air was passed to the unit. Furthermore the carbon on the catalyst was also substantially reduced over that previously obtained. It is also significant to note that as a result of the improved method of operation and handling of the catalyst during regeneration thereof a substantial increase in conversion of the hydrocarbon feed over that previously obtained was possible. In addition to the above, when operating in accordance with the method of this invention more coke was burned per hour in the presence of a greater quantity of air at a lower dispersed phase and stack temperature.

Having thus provided a general description of the method and means of this invention and presented specific examples of embodiments thereof, it is to be understood that no undue restrictions are to be imposed thereon, except as defined in the claims.

I claim:

1. A method for converting hydrocarbon reactant material and regeneration of catalytic material employed therein which comprises maintaining a relatively dense fluid bed of catalytic material superimposed by a dilute phase of catalytic material in each of two contacting zones, one of said contacting zones being a hydrocarbon conversion zone and the other of said contacting zones being a catalyst regeneration zone, passing hydrocarbon reactant material into the dense fluid bed of catalyst maintained in said conversion zone under conversion conditions to produce desired hydrocarbon conversion products, recovering hydrocarbon conversion products from the upper portion of said conversion zone, removing catalyst entraining hydrocarbonaceous material from said conversion zone and stripping the removed catalyst, passing stripped catalyst as a dilute suspension with relatively inert gaseous material from the lower portion of the stripping zone upwardly and directly into the dilute phase of catalyst in said regeneration zone without further cooling thereof, settling catalyst introduced in the dilute phase by gravity into the dense fluid bed of catalyst undergoing regeneration therebelow, passing regeneration gas into the dense fluid bed of catalyst in said regeneration zone under conditions to regenerate the catalyst by burning to produce gaseous combustion products and withdrawing gaseous combustion products of reduced temperature from the dilute phase of said regeneration zone.

2. A hydrocarbon conversion process which comprises superimposing a regeneration zone above a reaction zone, maintaining a dense fluid bed of catalyst in the lower portion of said regeneration zone and said reaction zone, introducing hydrocarbon reactant into the lower portion of said fluid bed of catalyst in said reaction zone under conditions to convert said hydrocarbon into desired conversion products, thereby coating the catalyst with hydrocarbonaceous material, passing catalyst continuously from said reaction zone into a stripping zone and stripping the catalyst therein at substantially conversion temperatures with a relatively inert gaseous stripping material, withdrawing hydrocarbon conversion products and stripped products of reaction from the upper portion of said reaction zone, passing catalyst admixed with steam as a confined stream from the lower portion of the stripping zone upwardly for discharge into a dilute phase of catalyst in the upper portion of the regeneration zone above the dense fluid bed of catalyst therein, settling by gravity catalyst discharged into the dilute phase of the regeneration zone into the dense fluid bed of catalyst therebelow, introducing oxygen containing gas into the lower portion of the dense fluid bed of catalyst in said regeneration zone under conditions to effect regeneration of the catalyst by burning carbonaceous material thereon, passing regenerated catalyst at an elevated temperature as a confined stream from the lower portion of the fluid bed of catalyst in said regeneration zone into the lower portion of the fluid bed of catalyst in said reaction zone, separating gaseous products of combustion of said regeneration step from entrained catalyst cooled by mixing with relatively cool catalyst discharged into said dilute phase in a plurality of cyclone separators within the upper portion of said regeneration zone and returning separated catalyst from said cyclone separators to the dense fluid bed in said regeneration zone.

3. A method for converting hydrocarbons and regenerating catalyst employed therein which comprises maintaining a dense fluid bed of catalyst in the lower portion of a reaction zone and a regeneration zone, passing hydrocarbon feed upwardly through said bed of catalyst in said reaction zone under conditions to convert said hydrocarbon feed into desired products, passing catalyst entraining hydrocarbonaceous material from said reaction zone into an adjacent stripping zone, stripping the catalyst in said stripping zone at a temperature below said hydrocarbon conversion temperature, passing stripped catalyst as a relatively dilute cooled suspension directly from the lower portion of the stripping zone into a dilute phase of catalyst in the upper portion of the regeneration zone and above the dense fluid bed of catalyst therein, stripping the catalyst discharged in the dilute phase of the regeneration zone with hot gaseous combustion products formed during regeneration of the catalyst with oxygen-containing gas introduced to the lower portion thereof, passing the thus stripped catalyst into the dense fluid bed of catalyst therebelow in said regeneration zone, passing regenerated catalyst directly as a confined stream into the fluid bed of catalyst in said reaction zone and separating gaseous combustion products from entrained catalyst in the upper portion of said regeneration zone at a reduced temperature sufficient to avoid after-burning.

4. An improved method of operating an exothermic reaction zone under elevated temperature conditions which comprises maintaining a relatively dense fluid bed of finely divided solid contact material in a lower portion of a contact zone under exothermic reaction conditions by introduction of a gaseous reactant material thereto, recovering gaseous products of said exothermic reaction at an elevated temperature from said dense fluid bed of solids, thereafter contacting the gaseous products with a portion of a relatively dilute first suspension of cooled solids and inert gaseous material under conditions to produce a second suspension of gaseous product and solids which is passed through a series of separation zones to recover solids from said gaseous products, passing the remaining portion of the solids from said first suspension downwardly into the fluid bed of solids countercurrent to hot gaseous products emitted therefrom, passing solids separated in said plurality of separation zones into said dense fluid bed and maintaining the temperature of the second suspension at a desired temperature by introducing a quench fluid into the gaseous material passed through the series of separation zones.

5. A system comprising in combination a regeneration zone, a reaction zone, and a stripping zone, each of said zones containing a dense fluid bed of catalyst in the lower portion thereof superimposed by a dilute phase of catalyst, said stripping zone positioned with respect to said reaction zone such that the dilute phase of said stripping zone is in open communication with the dilute phase of said reaction zone, means for passing catalyst from the dense fluid bed in said reaction zone into the dense fluid bed in said stripping zone, a plurality of downwardly extending catalyst transfer conduits communicating between the bottom portion of the dense fluid bed of catalyst in the regeneration zone and the lower portion of the reaction zone, an upwardly extending catalyst transfer conduit communicating between the lower portion of the dense fluid bed of catalyst in said stripping zone and the dilute phase of catalyst in said regeneration zone, means for introducing hydrocarbon reactant material to the lower portion of said reaction zone, means for recovering gaseous material from an upper portion of said reaction zone, means for introducing regeneration gaseous material to the lower portion of said regeneration zone, means for recovering gaseous material from an upper portion of said regeneration zone, means for introducing gaseous material to the lower portion of said stripping zone, means for introducing gaseous material to the bottom of said upwardly extending transfer conduit and cyclone separator means in the upper portion of each of said reaction zones and regeneration zones for recovery of entrained catalyst from gaseous material.

6. A method for removing residual hydrocarbonaceous material from finely divided catalyst employed in a hydrocarbon conversion reaction which comprises recovering catalyst entraining hydrocarbonaceous material from a hydrocarbon conversion zone, initially stripping the recovered catalyst with relatively inert gaseous material in a dense fluid phase condition, passing such initially stripped catalyst suspended in an inert gas to a regeneration zone, thereafter stripping the catalyst in a dilute phase condition with hot gaseous products of regeneration, passing catalyst from said dilute phase stripping step into a dense fluid bed of catalyst being regenerated with oxygen-containing gas to remove carbonaceous material from the catalyst by burning and recovering regeneration combustion gases of reduced temperature substantially free of entrained catalyst from said dilute phase stripping step.

7. In a process for the conversion of hydrocarbons in the presence of fluidized catalytic material and regeneration of the catalytic material, the improved method of operation for increasing the conversion capacity of the process which comprises passing a hydrocarbon feed into a conversion zone in contact with fluidized catalytic material maintained at conversion temperature and pressure conditions which has been regenerated as hereinafter described, recovering hydrocarbon conversion products from said catalytic material in said conversion zone, withdrawing catalytic material from said conversion zone and stripping said withdrawn catalytic material to remove entrained hydrocarbon material therefrom, passing the stripped catalytic material at a temperature below regeneration temperatures into the upper portion of a zone for countercurrent dilute phase contact with hot regeneration combustion product gases under regeneration temperature conditions, thereafter passing the catalyst on to the top of a dense fluid bed of catalytic material being regenerated with oxygen-containing gas and passing regenerated catalytic material from said dense fluid bed of catalytic material being regenerated into said hydrocarbon conversion zone.

8. An improved method for treating catalytic material which becomes contaminated with carbonaceous material in a fluidized hydrocarbon conversion process which comprises withdrawing catalytic material contaminated with carbonaceous material from a dense fluidized bed of catalytic material in a hydrocarbon conversion zone, initially stripping the thus withdrawn catalytic material in a dense fluidized condition with a relatively inert gaseous material comprising steam, thereafter further stripping the catalytic material in a separate zone in a dilute phase condition with gaseous products of regeneration, passing the thus stripped catalytic material into the upper portion of a dense fluidized bed of catalytic material being regenerated with oxygen containing gas to produce the above-mentioned gaseous products of regeneration and withdrawing regenerated catalytic material at an elevated temperature from the lower portion of the dense fluid bed of catalytic material being regenerated for passage to the fluid bed of catalytic material in said hydrocarbon conversion zone.

9. A method for cooling gaseous products of regeneration which comprises contacting the hot gaseous products of regeneration with cooler finely divided solid particle material and thereafter separating the gaseous product material from entrained finely divided solid material in the presence of a vaporizable material which further cools said gaseous product material.

10. A method for controlling the temperature of gaseous material withdrawn from a dense fluid bed of finely divided solids in a catalyst regeneration zone which comprises maintaining in a catalyst regeneration zone a dense fluid bed of catalyst to be regenerated superimposed by a dilute phase of catalytic material, introducing a regeneration gas into the lower portion of said dense fluid bed under regeneration conditions and recovering gaseous products of regeneration at an elevated temperature from said dense fluid bed, passing a confined stream of relatively cooled catalyst to be regenerated, suspended in an inert gas upwardly through said dense fluid bed to said dilute phase of catalytic material, passing said gaseous products of regeneration to said dilute phase of catalytic material for admixture therewith, said gaseous products being cooled by contact with said relatively cooled suspension, passing said gaseous products admixed with finely divided catalytic material through a plurality of separation zones for recovery of catalyst from gaseous products, and recovering gaseous products of reduced temperature from said plurality of separation zones.

11. A method for regenerating finely divided catalytic material contaminated with residual products of a hydrocarbon conversion reaction which comprises maintaining a relatively dense fluid bed of catalyst to be regenerated superimposed by a dilute phase of catalytic material in a regeneration zone, passing an oxygen-containing gas upwardly through said dense fluid bed under regenerating conditions, recovering regeneration effluent gases at an elevated temperature from said dense fluid bed, passing catalyst contaminated with residual products of a hydrocarbon conversion reaction as a dilute suspension in an inert gas at a temperature substantially below regeneration temperature into said regeneration zone above said dense fluid bed for admixture with said regeneration effluent gases to concomitantly strip said contaminated catalyst and cool said regeneration effluent gases, passing the thus treated regeneration effluent gases with entrained catalyst from the dilute phase through a plurality of separation zones under conditions to effect a separation of catalyst from regeneration effluent gases, passing separated catalyst from said separation zones directly to said dense fluid bed and recovering regeneration effluent gases of reduced temperature from said separation zones.

References Cited in the file of this patent

UNITED STATES PATENTS

| | | |
|---|---|---|
| 2,385,446 | Jewell et al. | Sept. 25, 1945 |
| 2,517,900 | Loy | Aug. 8, 1950 |
| 2,768,127 | Kimberlin et al. | Oct. 23, 1956 |
| 2,891,001 | Wickham et al. | June 16, 1959 |